Jan. 2, 1945. W. LE CLAIR 2,366,535
CARCASS HANDLING APPARATUS
Filed Nov. 23, 1943 2 Sheets-Sheet 1
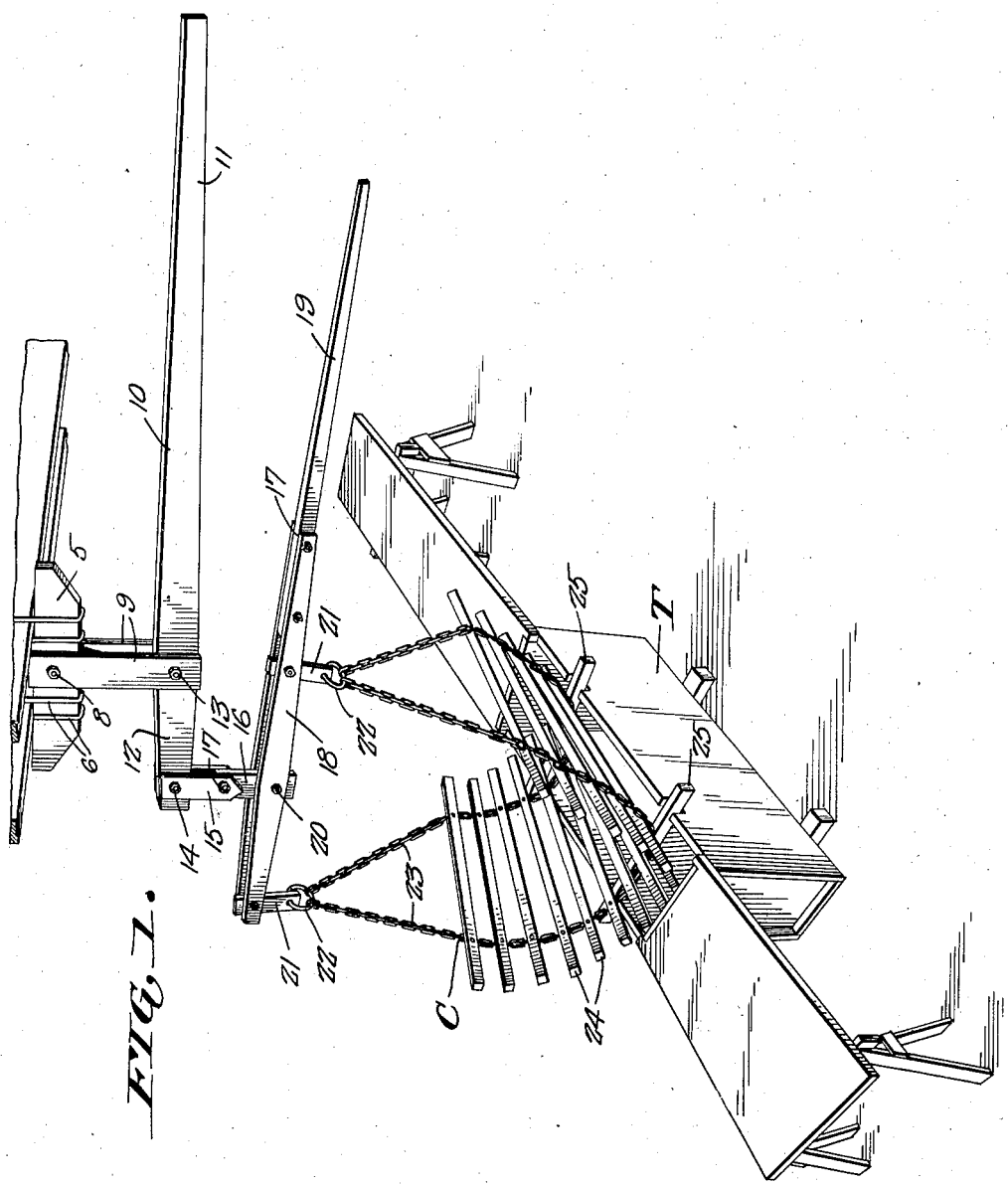
William Le Clair,
INVENTOR.
BY
Victor J. Evans & Co.
ATTORNEYS

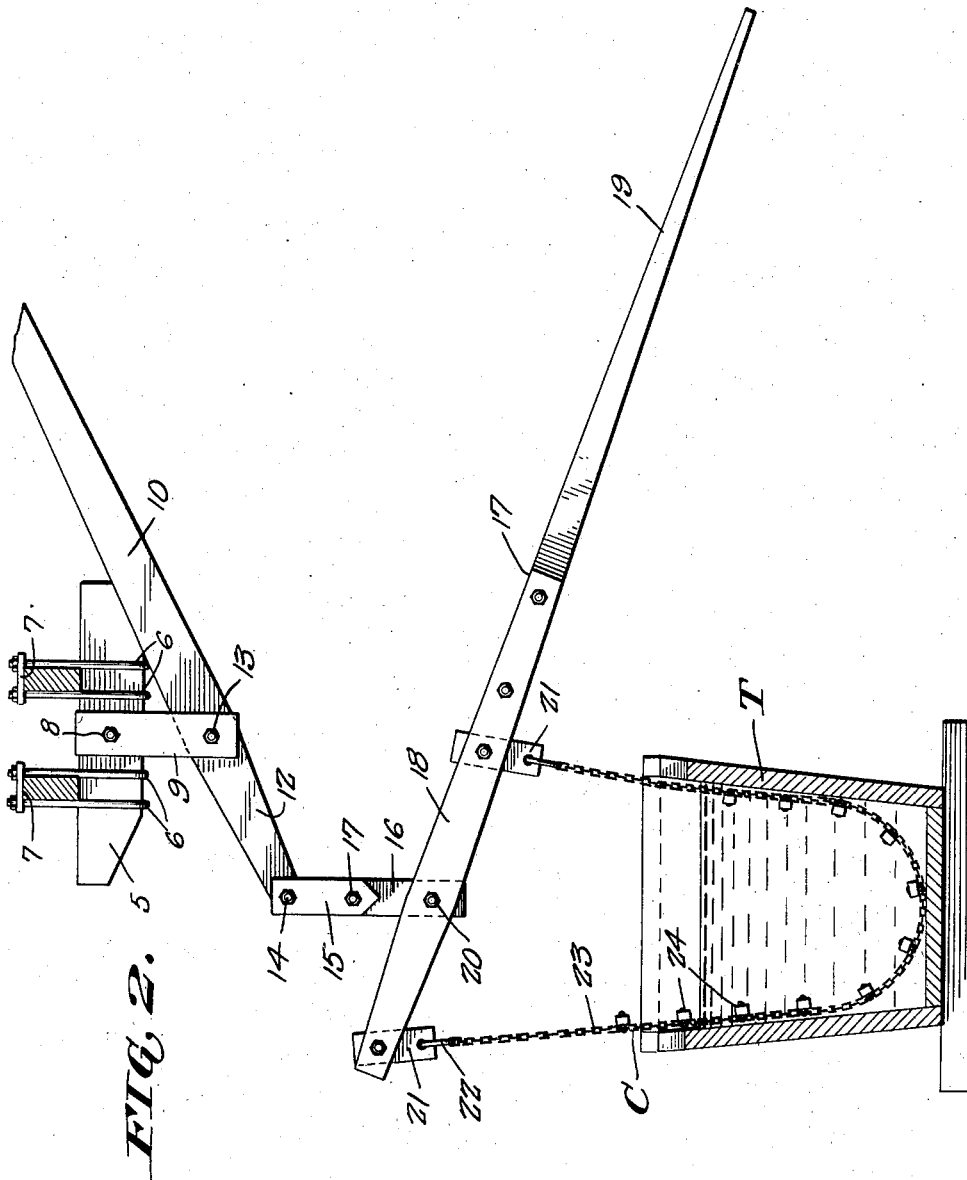

Patented Jan. 2, 1945

2,366,535

UNITED STATES PATENT OFFICE 2,366,535

CARCASS HANDLING APPARATUS

William Le Clair, Martinsdale, Mont.

Application November 23, 1943, Serial No. 511,462

5 Claims. (Cl. 17—15)

The present invention relates to improvements in apparatus for handling animal carcasses and similar objects.

A primary object of the invention is the provision of an apparatus which will enable the handling of a relatively heavy carcass with comparatively little manual effort.

Another object of the invention is to provide a carcass handling apparatus which is particularly adaptable for treatment of the carcass such as scalding and like operations.

A further object of the invention is the provision of a handling apparatus of the aforesaid character which utilizes manually operable levers for raising and lowering the carcass and for turning the same.

Still another object of the invention is the provision of a carcass handling apparatus which is relatively simple and inexpensive in construction and highly efficient in use.

Other objects and advantages of the invention will become apparent as the description progresses.

In the accompanying drawings forming a part of this specification and in which like numerals are employed to designate corresponding parts throughout:

Figure 1 is a perspective view of the improved apparatus in operative association with a scalding tank, and Figure 2 is a vertical sectional view through the same.

Referring to the drawings, wherein similar designating characters indicate corresponding parts, 5 indicates a support bar of elongated cross section and advantageously of a length suitable to span a pair of beams. The bar 5 is adapted to be positioned horizontally below the beams with its width arranged vertically and firmly hung on the beams by a plurality of U-bolts 6 connecting with support plates 7.

Fastened to the medial portion of the support bar 5 against the opposed side faces by a bolt 8 are a pair of vertically depending yoke forming bars 9 arranged to support a relatively long intermediately pivoted lever 10. This lever, which may be in the form of a flat wood bar taperingly reduced from its fulcrum point toward each end, is provided with a pivot aperture off center of its length so as to afford a relatively long handle portion 11 and a shorter extension portion 12 which may be a fraction of the length of the handle portion. A transversely extending bolt 13 extending through aligned apertures in the lever and the lower spaced end portions of the yoke bars 9 serves to form the pivot support of the lever.

To the outer end portion of the lever extension 12 is pivotally connected, through a transverse bolt 14, a depending bifurcated connection 15 having a suspension shank 16 connected to the bottom thereof by a pivot bolt 17.

The suspension shank functions to support a second lever 17 which may consist of a body part having a pair of transversely spaced elongated bar sections 18 rigidly connected with a longitudinally extending handle section 19. This lever is also intermediately pivoted through the medium of a pivot bolt 20 extended through aligned apertures in the shank 16 and the body forming bars 18, this fulcrum being disposed with respect to the length of the lever to provide a handle portion a number of times the length of the opposite extension portion. At equi-distantly spaced points from the pivot 20 the lever 17 carries a pair of pivotally suspended bars 21 each of which has a ring 22 at its lower end.

Hung from the lower lever 17 is a carrier generally indicated C, in the present instance embodying a pair of chains 23 having their ends connected with the respective rings 22 and a plurality of transversely extending slats 24 rigidly fastened to the longitudinally disposed chain sections so as to provide a trough shaped device in the form of a U-shaped sling.

This apparatus may be advantageously employed in connection with a scalding tank T of dimensions suitable to accommodate a carcass on the carrier therein and which may be provided with notches in the side walls for accommodation of a pair of removable cross bars 25.

During use, the manually adjustable upper and lower levers 10 and 17 are disposed in positions so that the carrier is brought to rest on the cross bars 25 of the tank so as to enable a carcass, such as a hog carcass to be readily positioned on the sling. Thereafter, a downward pull on the handle portion 11 of the upper lever will effect elevation of the carrier so as to permit removal of the cross bars after which the upper lever handle is elevated so as to lower the carcass laden carrier into the tank T for immersion of the carcass in the scalding bath. Through manipulation of the lower lever 17, that is by swinging the same up or down the flexible carrier or sling is rolled so as to turn the carcass to one side or the other.

Thus, by vertical movement of the upper elevating lever 10 the carrier C may be conveniently raised or lowered with reference to the tank or vat T while tilting or oscillation of the lower turning lever 17 causes effective turning of the carcass.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In apparatus of the character described, a pivotally supported elevating lever, a turning lever pivotally suspended from the said elevating lever, and a flexible carrier hung from the turning lever operable to turn an object thereon by tilting the said turning lever.

2. In apparatus of the character described, a pivotally supported elevating lever, a turning lever pivotally suspended from one end of the elevating lever, and a flexible carcass carrier hung from points equi-distantly spaced from the fulcrum of the turning lever disposed to roll so as to effect turning of a carcass upon up and down swinging movement of the said turning lever.

3. A carcass handling apparatus comprising an intermediately pivoted lever, fixed pivot means supporting the said lever for vertical swinging movement, a lower lever pivotally suspended from one end of the first mentioned lever, a pair of suspension elements pivotally depending from points spaced equi-distantly from the fulcrum of the lower lever, and a flexible carcass carrying sling having its ends connected to the suspension elements adjustable vertically by selective movement of the upper lever and adapted to roll for turning the carcass upon tilting of the lower lever.

4. An apparatus for handling a carcass for scalding comprising a lever intermediately pivoted to a fixed support, a second lever pivotally suspended from one end of the first mentioned upper lever, and an approximately U-shaped carrier sling suspended from points spaced equidistantly from the fulcrum of the lower lever and adjustable vertically through movement of the upper lever and disposed for rolling to turn a carcass thereon by tilting of the lower lever.

5. A handling apparatus of the character described comprising a fixed support, an intermediately pivoted lever having a relatively long handle projection at one end mounted on the support, a bifurcated support pivotally depending from the end of the shorter arm of the said lever, a lower lever having its intermediate portion pivotally connected with the said depending pivoted support and provided with a relatively long handle projection at one end, and a flexible sling having its ends connected to points spaced equi-distantly from the fulcrum of the lower lever and adapted to support a carcass in horizontal position, the said sling being vertically adjusted through pivoted movement of the upper lever and rolled through tilting of the lower lever for turning a carcass theeron.

WILLIAM LE CLAIR.